(No Model.)
T. F. LAWSON.
COTTON CHOPPER AND CULTIVATOR.
No. 379,962. Patented Mar. 27, 1888.
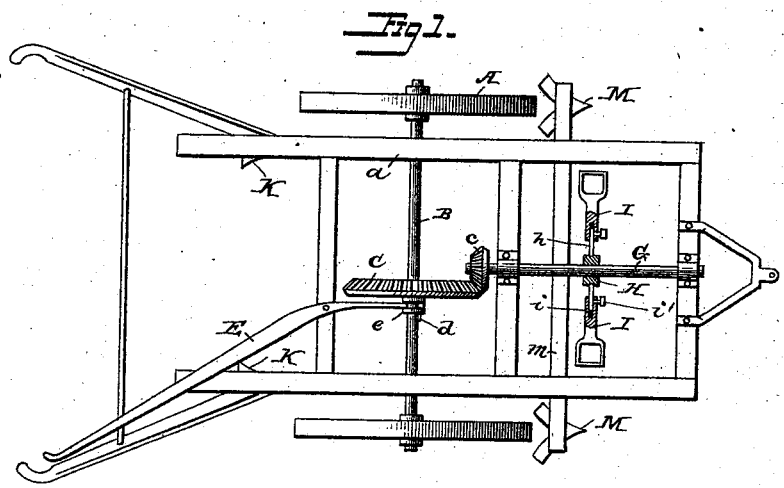
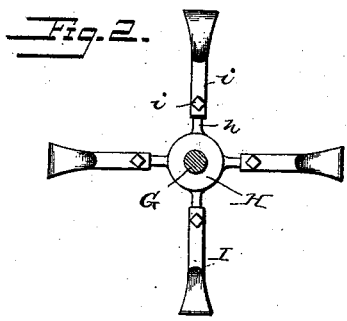
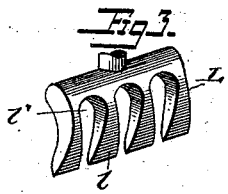
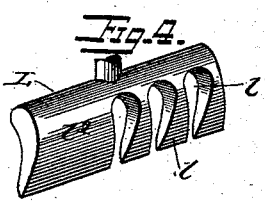
Attest:
Jno. G. Hinkel, Jr.
Sidney L. Johnson
Inventor:
Thomas F. Lawson,
by Foster & Freeman
Attys.

UNITED STATES PATENT OFFICE.

THOMAS F. LAWSON, OF ATHENS, GEORGIA.

COTTON CHOPPER AND CULTIVATOR.

SPECIFICATION forming part of Letters Patent No. 379,962, dated March 27, 1888.

Application filed May 20, 1887. Serial No. 238,879. (No model.)

*To all whom it may concern:*

Be it known that I, THOMAS F. LAWSON, a citizen of the United States, residing at Athens, Clarke county, Georgia, have invented certain new and useful Improvements in a Cotton and Rice Thinner, Chopper, and Cultivator, of which the following is a specification.

In the cultivation of cotton and some other plants it is customary to sow the seed thickly in a continuous comparatively wide stream or row. The plants, as they come up after sowing in this manner, stand entirely too close together and require to be thinned. This thinning has frequently been done by implements known as "cotton-choppers," which consist of swinging hoes or choppers adapted to cut transversely across the row and leave the plants standing in hills or bunches; but such bunches have to be again thinned, else the plants, standing too close together, will so crowd each other as to prevent their proper development.

I first thin out the plants by a peculiar rake-shaped hoe or chopping implement, but leaving the row continuous. This gives increased vigor to the plants left standing and hastens their growth. After having attained sufficient size the rows of plants are chopped out by any ordinary cotton-chopping implement, and then require no further thinning.

Figure 1 is a top plan view of a cultivating and chopping implement embodying my invention. Fig. 2 is a detached view of the hub by which the chopping-hoes are attached to the shaft. Fig. 3 is a perspective view of one of the thinning-hoes. Fig. 4 shows a modified form of the thinning-hoe.

In the figures, $a$ represents the frame of a cotton-chopping machine, supported upon wheels A, one or both of which are fast to the axle B.

C is a bevel-wheel turning with the axle, to which it is secured by a feather, $d$, on which it slides, the hub of this wheel having formed therein a circular seat, $e$, with which engages a shipping-lever, E.

$c$ is a bevel-pinion, driven by wheel C and secured to a shaft, G, mounted longitudinally of the frame and carrying the hoes or chopping-blades I. Mounted on this shaft is a hub, H, carrying short projecting arms or spokes $h$, to which are adjustably secured the hoes. These latter are provided with hollow handles $i$, which fit over the spokes $h$ and are secured thereto by set-screw $i'$, or otherwise. This method of securing the hoes to the shaft, which gives them the proper swinging or rotary movement, enables them to be easily adjusted toward or from the ground, to be removed and replaced by a new or differently-formed hoe, and when a stirrup-shaped chopper such as shown in Fig. 1 is used to be turned half round, so as to utilize both cutting-edges of the hoe.

L, Fig. 3, is a rake-shaped chopper adapted to be used for thinning out the plants when they stand too thick. It has a number of teeth, $l$, with comparatively broad cutting-edges, which teeth are separated by spaces widening toward their bases, as shown at $l'$. This chopper is employed when the plants are quite small, serving only to thin the plants without destroying the continuity of the row. The wide spaces at the bases of the teeth permit the chopper to pass over the plants left standing without injury to them, and also facilitates the teeth clearing themselves of any matter which they might otherwise gather.

After the thinning-hoe has been used the plants are usually left standing for about a week, or until they begin to grow vigorously, when any usual or preferred cotton-chopper is used in the usual manner.

I have shown in Fig. 4 a hoe or chopper adapted both to thin and cut out, so as to leave the plants in bunches or hills at a single operation. It is provided throughout part of its length with teeth $l$, separated by spaces $l'$, as described, which part of the hoe is intended to thin the plants left standing. The other portion, $l^2$, of the hoe is a single blade adapted to entirely cut out the plants between the hills.

In front of each of the wheels A, and supported by standard $m$, is a small sweep blade or shovel, M, which serves to level the soil and make a track for the wheel, thus causing the machine to run more easily and adding much to the accuracy of its operations.

K K represent small plows or cultivator-teeth carried at suitable points by the frame of the machine.

I claim—

The herein-described implement for thinning plants, consisting of a hoe, L, having a broad blade, $l^2$, at one side and cutting-teeth $l$ at the other side, substantially as described.

In testimony whereof I have signed my name to this specification in the presence of two subscribing witnesses.

THOMAS F. LAWSON.

Witnesses:
EDWARD HOPKINSON,
L. SCHEVENELL.